United States Patent [19]

Warshawsky

[11] 3,811,823
[45] May 21, 1974

[54] APPARATUS FOR COOLING PULVERULENT MATERIAL

[75] Inventor: Jay Warshawsky, Allentown, Pa.

[73] Assignee: Fuller Company, Catasauqua, Pa.

[22] Filed: Apr. 12, 1973

[21] Appl. No.: 350,544

[52] U.S. Cl................... 432/80, 34/164, 432/103
[51] Int. Cl............................................. F27b 7/38
[58] Field of Search........... 432/15, 78, 80, 103, 58; 34/164

[56] References Cited
UNITED STATES PATENTS

| | | | |
|---|---|---|---|
| 2,782,019 | 2/1957 | Turney et al. | 432/58 |
| 3,741,715 | 6/1973 | Sylvest | 432/78 |
| 2,761,668 | 9/1956 | Sylvest | 432/78 |

Primary Examiner—John J. Camby
Attorney, Agent, or Firm—Frank S. Thompson

[57] ABSTRACT

Apparatus for cooling heated pulverulent material which has been discharged from a rotary kiln, furnace, or reactor and also for recovering the product heat for use as a preheated source of air for combustion in the kiln or for drying in another process. The apparatus comprises several levels of fluidized beds which are arranged one above another and spaced from the walls of the outer casing, so that pulverulent material flows by means of displacement overflow from the upper to the lower bed while cooling air passes upward, through, and around the fluidized bed of material. The cooling air is then removed from the casing and discharged directly as preheated air into a rotary kiln, furnace, or reactor.

14 Claims, 5 Drawing Figures

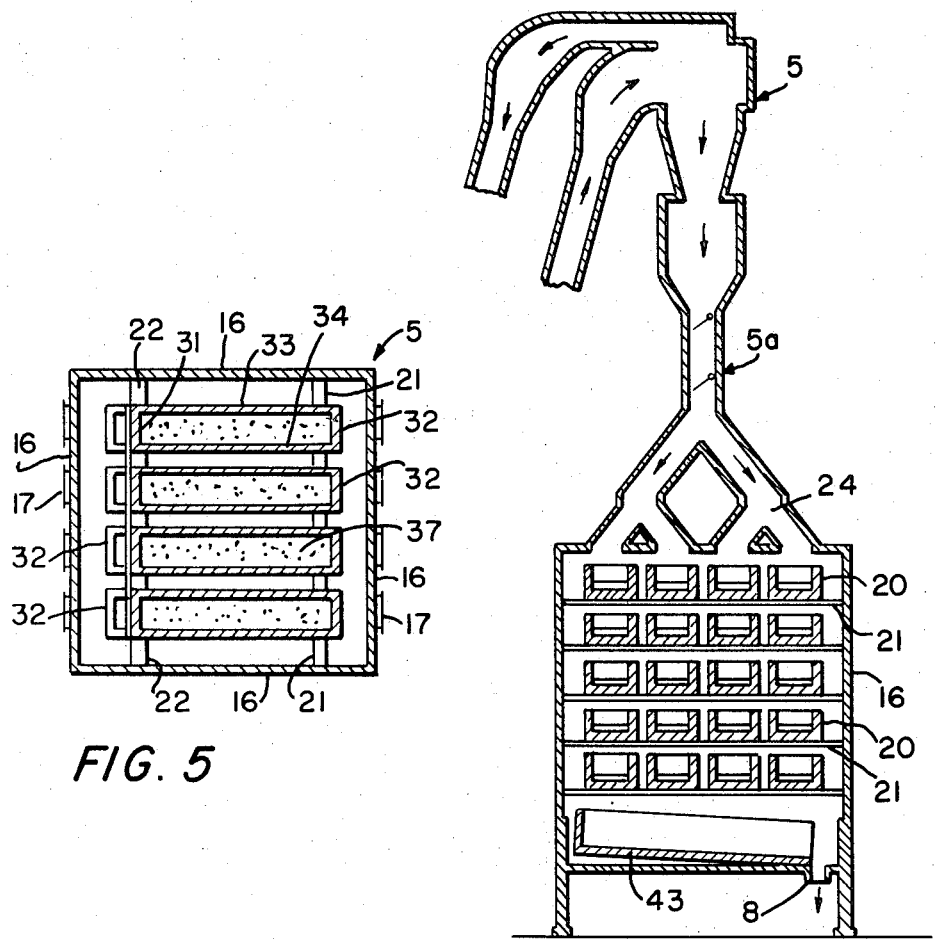
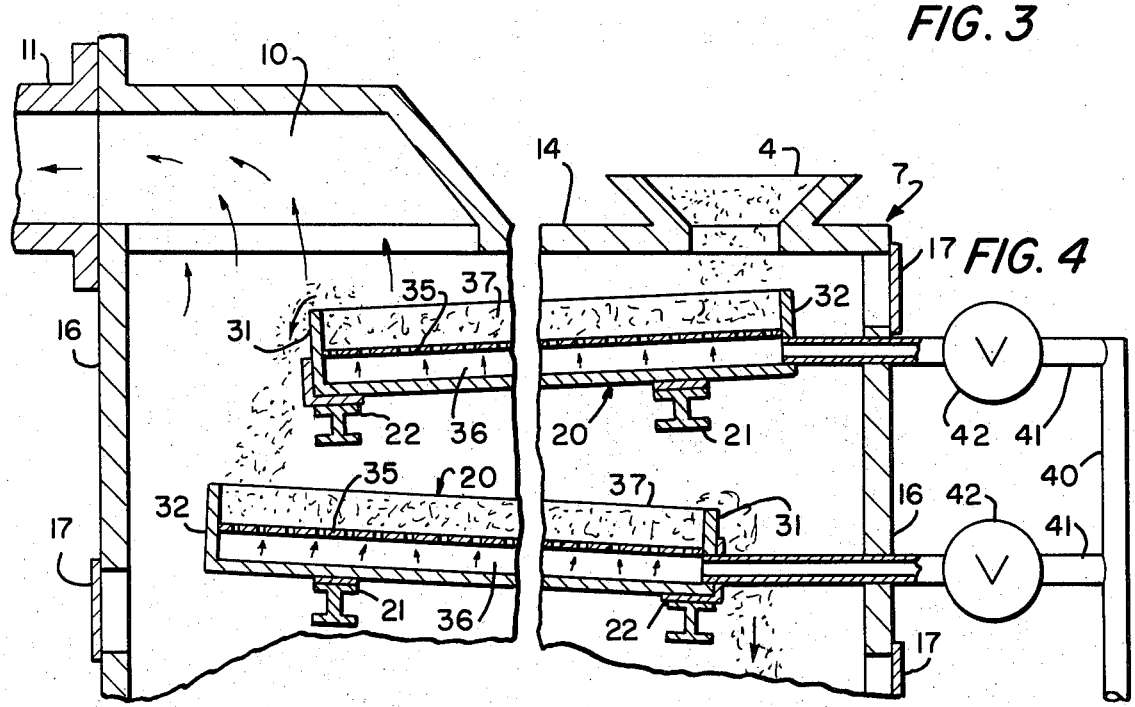
FIG. 5
FIG. 3
FIG. 4

APPARATUS FOR COOLING PULVERULENT MATERIAL

BACKGROUND OF THE INVENTION

This invention relates to apparatus for treating finely divided pulverulent material and in particular a multi-level apparatus for cooling finely divided pulverulent material such as alumina discharged from a furnace such as a rotary kiln.

Prior to the present invention, various types of apparatus were known for treating finely divided pulverulent material such as the cooling of alumina by direct contact with a cooling gas such as air. Many prior apparatus rely on countercurrent contact between the pulverulent material to be cooled and the cooling gas. The material to be cooled passes in a generally downward direction through the material cooler while the cooling air passes upwardly through the falling material. Various baffles or plate means have been placed in the cooler housing to increase the residence time of the material and the air in the cooler housing in order to thereby increase the contact time between the cooling air and the material.

In some of the prior devices, such as that shown in U.S. Pat. No. 3,263,346, perforated plates are arranged at various levels whose perforations are large enough to permit pulverulent material to pass therethrough countercurrent to the cooling air which is supplied to the cooler from a source beneath the lowest plate. The air passes upwardly through the various levels of plates and entrains material due to the jet action of the air passing through the restricted openings of the perforations. This type of device has disadvantages in that the perforations may become plugged by pulverulent material and also excessive entrainment of fine pulverulent material such as alumina will occur. Excessive entrainment of pulverulent material necessitates the use of large cyclone separators through which all of the discharged air msut be passed before being discharged to the atmosphere or used in another process. Furthermore, to achieve the jet action of the air in this apparatus requires high operating pressures which in turn result in increased power consumption and operating costs.

In other prior devices, some of the air is supplied to the housing at different levels by supplying air to the plenum chamber beneath hoppers arranged at various levels in the housing. One such arrangement for drying material is shown in U. S. Pat. No. 1,472,314. This arrangement supplies the air to the plenum chamber in a pulsating manner. Supplying air at various levels provides the dual purpose of providing a means for advancing material from the inlet to the outlet while achieving some heat exchange between the air and the material. However, the arrangement shown in this patent does not take full advantage of this concept. The period of contact between the air and the pulverulent material is limited. In addition, once the air has made its initial contact with the material, its useful purpose is essentially exhausted.

The present invention has as its purpose to provide a heat exchange apparatus which will not be susceptible to clogging by the material and will increase the contact time between the air and material without producing excessive amounts of material entrainment by the heat exchange air.

In order to achieve this objective, the present invention establishes a fluidized bed of material at various levels in the apparatus by supplying selected quantities of gaseous fluid to the plenum chamber of conveyors arranged so that effective heat transfer is achieved in the fluidized bed on each level without entraining excessive quantities of pulverulent material. Controlling the amount of air supplied to the various plenum chambers further provides the capacity to control the rate of flow of material through the cooler and permits a matching of the quantity of air used in the heat transfer process with that quantity of air necessary and useful as preheated combustion air for other processes. Thus, large cyclone separators or dust collectors may be eliminated.

SUMMARY

It is, therefore, the principal object of the present invention to provide an apparatus for treating pulverulent material with a gaseous fluid wherein the heat exchange process will be more easily controlled than in similar apparatus of the prior art.

It is another object of the present invention to provide an apparatus for cooling finely divided and easily fluidized pulverulent material without entraining excessive quantities of pulverulent material in the spent treating gas.

It is a further object of this invention to provide a cooler for hot pulverulent material which may be operated with reduced quantities of gaseous fluid per amount of pulverulent material cooled.

It is a further object of this invention to provide a cooler for hot pulverulent material which will require lower operating power than similar apparatus of the prior art.

It is a further object of the present invention to provide a pulverulent material cooler capable of discharging uniformly cooled pulverulent material by controlling the rate of flow of the pulverulent material through the cooler.

In general, the foregoing and other objects will be carried out by providing in an apparatus for cooling hot pulverulent material including a housing having an inlet for hot material and an outlet for cooled material, means for conveying the material from said inlet to said outlet, and means for passing a cooling gas through said material, the improvement comprising: a plurality of spaced apart conveyors, each mounted in said housing and arranged with respect to each other to form at least one generally vertically oriented column whereby the uppermost conveyor receives material from said inlet; each of said conveyors being positioned to receive material at one end thereof and discharge material from its other end whereby material will cascade from a higher conveyor to a lower conveyor; each of said conveyors including means defining a plenum chamber, a gas permeable deck for supporting material above a plenum, the chamber and a forward wall for confining a quantity of material on said gas permeable deck; means for supplying cooling gas to the plenum chamber of each conveyor for passage through said gas permeable deck and the material confined on said gas permeable deck; and means for exhausting spent cooling gas from said housing.

BRIEF DESCRIPTION OF THE DRAWINGS

The invention will be described in connection with the annexed drawings wherein:

FIG. 3 is a sectional view of the material treating apparatus of the present invention;

FIG. 4 is a fragmentary sectional view on an enlarged scale of a portion of the present invention shown in FIG. 2; and FIG. 5 is a sectional view of the material treating apparatus of the invention taken along the line 5—5 of FIG. 2 in the direction of the arrows.

DESCRIPTION OF THE PREFERRED EMBODIMENT

Figure 1:
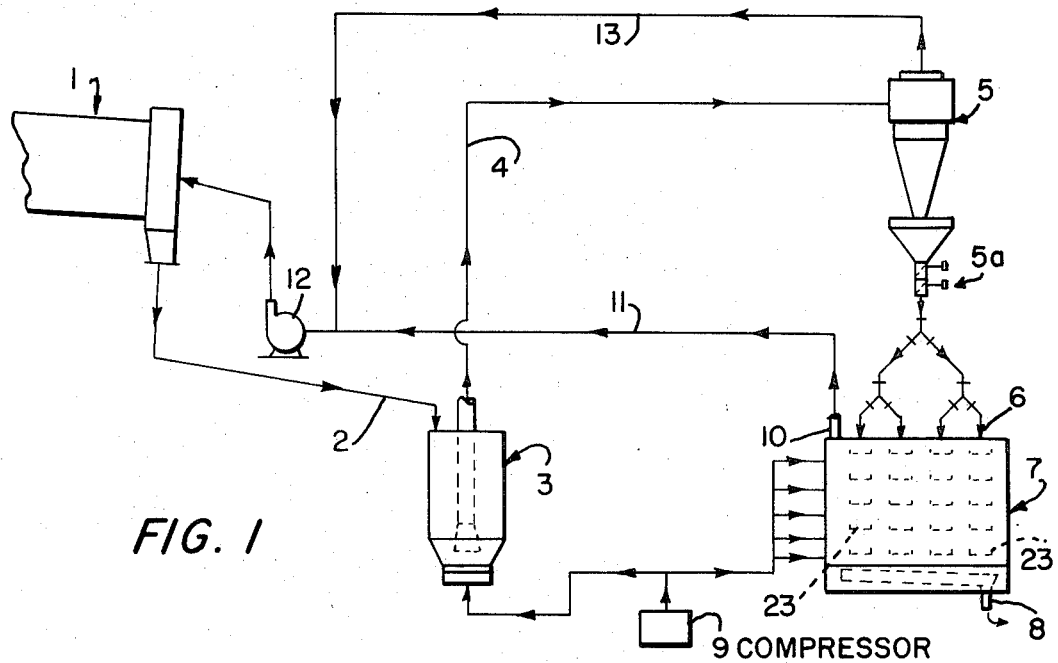
FIG. 1 is a diagrammatic view of the cooling apparatus of the present invention shown as part of a system for cooling hot pulverulent material discharged from a kiln and providing preheated combustion air to the kiln.

FIG. 1 is a schematic diagram in which the present invention is shown as a multi-level cooler for hot pulverulent material received from a source such as a conventional rotary kiln. Hot pulverulent material is discharged from the rotary kiln 1 through a conduit 2 into a conveyor 3 shown here as an air lift. The pulverulent material is conveyed through a conduit 4 to a cyclone separator 5 which is flow connected through valved conduit 5a to at least one pulverulent material inlet 6 in the top of a cooler generally indicated at 7. Initial cooling of the material occurs in the air lift 3. The pulverulent material is cooled in the multi-level cooler 7 by direct contact with a gaseous fluid such as air as the pulverulent material descends towards the lower discharge outlet 8 to be conveyed from the multi-level cooler by any suitable means. Cool air which is supplied by a source of gaseous fluid under pressure, shown generally as compressor 9, enters the multi-level cooler, where it becomes heated by countercurrent contact with the hot pulverulent material. The air is then discharged through air discharge outlet 10 to be returned through conduit 11 by means such as fan 12 to kiln 1 to be used as preheated combustion air. In the event more air is used in cooling the hot material than can be used by the kiln 1, some of the cooling air will be diverted to a high efficiency dust collector (not shown). Gaseous fluid from the cyclone 5 is also returned to the kiln 1 through a conduit 13.

Referring now to FIGS. 2 through 5, it is seen that multi-level cooler 7 consists of a housing having top wall 14, bottom wall 15 and side walls 16. Access doors 17 may be provided. A plurality of conveyors 20 are mounted on an incline in the cooler 7 by means of suitable supports 21 and 22. As can be seen from FIGS. 1 and 3, the conveyors 20 are mounted in a stacked arrangement so that they form at least one and preferably a plurality of generally vertically oriented columns 23. As shown in the drawing, when there are a plurality of columns 23, the inlet 6 should be divided into a plurality of branches 24 so that material will be distributed to the various columns 23 in substantially equal quantities. Each of the conveyors 20 in column 23 is arranged with respect to the other conveyors of that column so that pulverulent material will cascade from the higher conveyor to the next lower conveyor in a zig-zag manner; this is clearly shown in FIGS. 2 and 4. Further, each conveyor 20 is spaced from the side walls of the cooler 7 and from the other conveyors.

Referring specifically to FIGS. 4 and 5, each conveyor 20 includes a bottom wall 30, forward wall 31, rear wall 32 and side walls 33 and 34. A gas permeable deck 35, made of any suitable material such as a high temperature fabric, divides the conveyor into a lower plenum chamber 36 and an upper material chamber 37. The deck 35 is interposed between the bottom wall 30 and the top of the forward wall 31, rear wall 32 and side walls 33 and 34 so that the material chamber 37 will confine a quantity of material.

Gaseous fluid such as air under pressure is supplied from the compressor 9 to the plenum chamber 36 of each of the conveyors 20. The supply system includes a main conduit 40 which serves as a manifold and a plurality of conduits 41 each flow connecting conduit 41 with a plenum chamber 36. Each conduit 41 includes a valve 42 for controlling the volume of air supplied to the plenum chamber 36 of its associated conveyor 20. The compressed air passes through the gas permeable deck 35 whereupon the air fluidizes and cools the pulverulent material confined in the material chamber 37. Spent cooling air flows around and between higher conveyors 20 to cool the outside of the conveyors and the housing walls before being discharged through outlet 10.

In operation, hot material to be cooled is supplied to the top conveyors 20 of each column 23. A quantity of material is confined in the chamber 37. With cooling air passing through and fluidizing the material, the level of material in the chamber 37 is increased. The fluidization of the pulverulent material causes the material to act as a liquid and flow down along the deck 35 by gravity. As more material is added to the first or top conveyor 20, the material will spill over the forward wall 31 by means of volumetric displacement and cascade onto the next lower conveyor 20. This action will continue until the material is discharged from the last conveyor 20 onto a discharge conveyor 43, simklar in construction to conveyors 20, and then into outlet 8.

Figure 2:
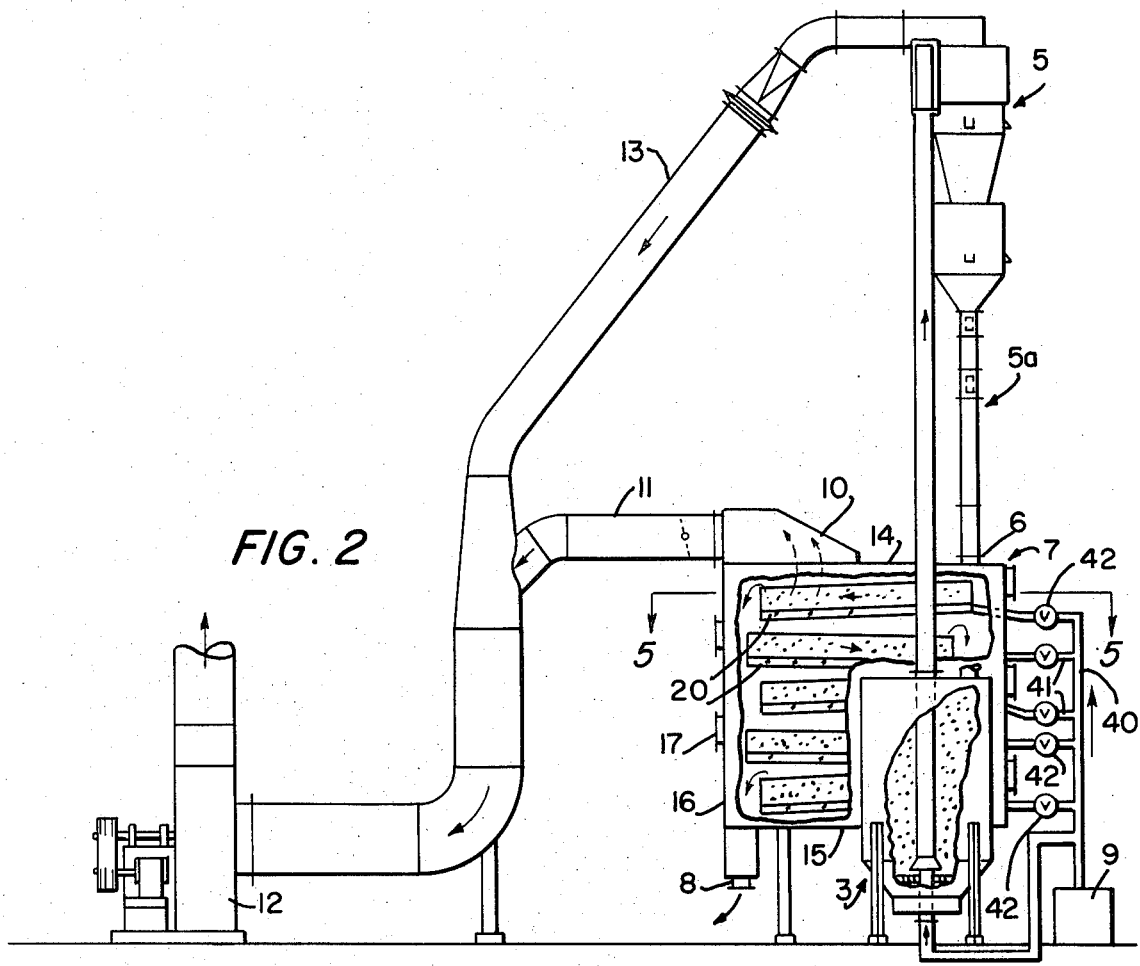
FIG. 2 is an elevation view of the present invention similar to FIG. 1 but with parts shown in greater detail.

While the conveyors 20 of FIGS. 2 and 4 have been shown slightly inclined downwardly towards the forward wall 31, it should be understood that the conveyors 20 could be substantially horizontal. While using horizontal hoppers, forward wall 31 would be slightly lower than rear wall 32 and side walls 33 and 34 so that a volumetric displacement would still occur which would permit material to cascade from the higher conveyor to the next lower conveyor. However, in this case, gravity would not have any affect on the conveyance of material along the conveyor from the rear wall 32 to the forward wall 31. Alternately, when substantially horizontal conveyors are used, all walls of the conveyor could be equal in height and the forward wall would in this instance be provided with a weir opening which would permit a controlled volumetric displacement. Furthermore, it should be understood that any conveyor arrangement which will confine a quantity of pulverulent material within the material chamber 37 is intended to be within the basic teaching of the present invention.

The present invention provides the advantage that the quantity of cooling compressed air which is introduced into the conveyor plenum 36 for efficient cooling operation can be regulated manually or automatically by means of control valves 42. Control valves 42 can be provided with a temperature sensitive means (not shown) for regulating the flow of air into the plenum chamber 36 of each conveyor level based upon an inverse relationship of temperature to quantity of air flow. As the temperature of the air in the conveyor plenum increases due to higher temperature in the material chamber, the quantity of air required will be decreased for a constant velocity of air through the gas permeable deck 35. Therefore, the velocity of air thorugh the deck 35 can be regulated at each level to remain below the critical velocity, defined as the velocity of air through the material at which the entrainment of pulverulent material by the air passing through the bed of material will occur.

If reasonably constant material feed conditions can be expected, the velocity of the air through gas permeable deck 35 can also be controlled by alternate means. The permeable deck can be constructed so that the surface area of deck through which the air passes is proportionally different on each level by an amount which will maintain the air velocity below the critical velocity. Also, the size of openings of the permeable deck could be varied to maintain the velocity below the critical velocity.

In general, it can be stated that by keeping the gas velocity through the bed of material on each conveyor below the critical velocity, the entrainment of material by the gas will be substantially reduced or eliminated.

In the preferred embodiment, it is believed that by regulating the quantity of compressed air which passes through the gas permeable deck 35 a temperature equilibrium can be achieved between the temperature of hot pulverulent material in the fluidized bed and the temperature of the air passing through the bed on each level without entraining the pulverulent material. Therefore, by the present invention, the proper amount of cooling gaseous fluid can be supplied to each level by means of control valve 42 so that temperature equilibrium can be reached without the entrainment of pulverulent material. It is believed that the present invention will achieve an increased rate of cooling per amount of cooling gaseous fluid supplied than coolers of the prior art. Furthermore, with a reduction in the amount of pulverulent material which will be entrained by the air of the present invention, there will be a corresponding reduction in the need for a high efficiency dust collector.

By the present invention, material is confined in each conveyor in order to provide a sufficient amount of contact time between the cooling air and the material to be cooled so that effective cooling of the material can be achieved. The confining of material at each level is important so that there can be efficient gas-solids contact at each level of the cooler. As the height of the fluid bed is increased, the gas-solids contact time is increased. The bed height is adjusted through the use of forward wall 31 at the discharge end of each fluidized conveyor 20. The conveyors 20 are spaced from the side walls so that spent cooling air which has already passed through a layer of material will cool the sides of the cooler housing and the sides of the other conveyors.

It will be appreciated by those skilled in the art that the above apparatus may also be used to effectively dry or heat or otherwise treat pulverulent material by contacting the pulverulent material with a gaseous fluid such as air. Rather than have the conveyors arranged so that the material cascades in a zig-zag pattern, the conveyors could be arranged so that the material always flows in the same direction. A column of conveyors would still be formed.

It is intended that the foregoing description be merely that of a preferred embodiment and that the invention be limited solely by that which is within the scope of the appended claims.

I claim:

1. Apparatus for treating pulverulent material with a gaseous fluid comprising:
    a housing including a top wall and side walls and having an inlet adapted to be connected to a source of pulverulent material to be treated and an outlet for discharging treated pulverulent material;
    means for conveying pulverulent material from said inlet to said outlet including a plurality of conveyors arranged to form at least one generally vertically oriented column with the conveyors of each column arranged with respect to the other conveyors of that column so that pulverulent material will cascade from a higher conveyor to the next lower conveyor;
    each of said conveyors including a bottom wall, side walls and forward and rear end walls, and a gas permeable deck dividing said conveyor into a lower plenum chamber and an upper material chamber;
    said conveyor side walls and forward and rear end wall dimensioned to confine a quantity of material on said gas permeable deck;
    means for supplying gaseous fluid under pressure to said lower plenum chamber for passage through said gas permeable deck and the material confined in said material chamber for treating the material;
    means for mounting said conveyors in said housing spaced from said housing side walls to permit the gaseous fluid which has passed through the material to flow around the walls of said conveyors; and
    means for exhausting spent treating gas from said housing.

2. Apparatus for treating pulverulent material according to claim 1 wherein gaseous fluid under pressure is supplied to each of said conveyors and further comprising means for controlling the volume of gaseous fluid supplied to each conveyor.

3. Apparatus for treating pulverulent material according to claim 2 wherein gaseous fluid is supplied to each of said conveyors at a pressure and volume sufficient to fluidize the material confined on said gas permeable deck whereby the material flows along the conveyor by means of volumetric displacement.

4. Apparatus for treating pulverulent material according to claim 3 wherein there are a plurality of columns of said conveyors; and said apparatus further comprises means for supplying a substantially equal quantity of pulverulent material to be treated to each of said columns of conveyors.

5. The apparatus for treating pulverulent material according to claim 3 further comprising a gas-solids separator, means for supplying a mixture of gaseous fluid and material to be treated to said gas-solids separator, means for supplying separated pulverulent material from said gas-solids separator to said housing inlet, and means for discharging separated gaseous fluid.

6. Apparatus for treating solid pulverulent material according to claim 5 wherein there are a plurality of columns of said conveyors; and said apparatus further comprises means for supplying a substantially equal quantity of pulverulent material to each of said columns of conveyors.

7. Apparatus for treating solid pulverulent material according to claim 3 wherein said conveyors are arranged one under another so that pulverulent material will cascade from the higher of said conveyors to the next lower of said conveyors in a zig-zag manner.

8. Apparatus for treating solid pulverulent material according to claim 3 wherein there are a plurality of columns of conveyors; the conveyors of each column arranged one under another so that pulverulent material will cascade from the higher of said conveyors to the next lower of said conveyors in a zig-zag manner; and further comprising means for supplying a substantially equal quantity of pulverulent material to each of said columns of conveyors.

9. Apparatus for treating solid pulverulent material according to claim 8 comprising a gas-solids separator, means for supplying a mixture of gaseous fluid and material to be treated to said gas-solids separator, means for supplying separated pulverulent material from said gas-solids separator to said housing inlet, and means for discharging separated gaseous fluid.

10. In an apparatus for cooling hot pulverulent material including a housing having an inlet for hot material and an outlet for cooled material, means for conveying the material from said inlet to said outlet, and means for passing a cooling gas through said material, the improvement comprising: a plurality of spaced apart conveyors, each mounted in said housing and arranged with respect to each other to form at least one generally vertically oriented column whereby the uppermost conveyor receives material from said inlet; each of said conveyors being positioned to receive material at one end thereof and discharge material from its other end whereby material will cascade from a higher conveyor to a lower conveyor; each of said conveyors including means defining a plenum chamber, a gas permeable deck for supporting material above the plenum chamber and means for confining a quantity of material on said gas permeable deck; means for supplying cooling gas to the plenum chamber of each conveyor for passage through said gas permeable deck and the material confined on said gas permeable deck to thereby cool the material; and means for exhausting spent cooling gas from said housing.

11. In an apparatus for cooling hot pulverulent material according to claim 10 wherein said housing includes side walls and a top wall, the improvement further comprising said conveyors being spaced from said side walls and top wall to permit spend cooling gas to flow around the walls of said conveyors and said conveyor includes a forward wall to define the means for confining a quantity of material on said gas permeable deck.

12. In an apparatus for cooling hot pulverulent material according to claim 11, the improvement further comprising means for controlling the volume of cooling gas supplied to the plenum chamber of each of said conveyors.

13. In an apparatus for cooling hot pulverulent material according to claim 12 wherein there are a plurality of columns of conveyors arranged in parallel and the improvement further comprises means for dividing the hot pulverulent material so that hot material is supplied to each column.

14. In an apparatus for cooling hot pulverulent material according to claim 11, the improvement further comprising means for maintaining the velocity of gaseous fluid passing through the material confined on said gas permeable deck below the critical velocity.

* * * * *